(12) United States Patent
Angel et al.

(10) Patent No.: US 7,425,028 B1
(45) Date of Patent: Sep. 16, 2008

(54) COMBINATION HANDLE AND SEWER HOSE SUPPORT

(75) Inventors: Bruce A. Angel, Kernersville, NC (US); Anthony D. Moore, Summerfield, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 0 days.

(21) Appl. No.: 11/605,813

(22) Filed: Nov. 29, 2006

(51) Int. Cl.
B65G 7/12 (2006.01)
F16L 3/00 (2006.01)

(52) U.S. Cl. .......................... 294/16; 294/170; 16/422; 248/49

(58) Field of Classification Search ............... 294/16, 294/27.1, 29, 31.1, 33, 137, 145, 158, 170; 16/422, 425; 248/49
See application file for complete search history.

(56) References Cited

U.S. PATENT DOCUMENTS

| | | | | |
|---|---|---|---|---|
| 993,253 A * | 5/1911 | Key | ............................ | 294/33 |
| 1,255,791 A * | 2/1918 | Rawlings | ...................... | 294/33 |
| 1,752,143 A * | 3/1930 | Bishman | ...................... | 294/166 |
| 3,317,232 A * | 5/1967 | McFaul | ........................ | 294/33 |
| 3,701,558 A * | 10/1972 | Baker | ........................... | 294/33 |
| 3,711,905 A * | 1/1973 | Eckerdt et al. | ................. | 24/563 |
| 4,082,242 A * | 4/1978 | Smith | ............................ | 248/83 |
| 4,368,912 A * | 1/1983 | Holtz | ......................... | 294/87.1 |
| 4,722,500 A * | 2/1988 | Bray | ............................ | 248/49 |
| 4,993,675 A * | 2/1991 | Walker | ..................... | 248/311.2 |
| 5,794,999 A * | 8/1998 | Corsaro | ........................ | 294/16 |
| 6,619,596 B1 | 9/2003 | Caine et al. | .................... | 248/49 |

* cited by examiner

Primary Examiner—Dean J Kramer

(57) ABSTRACT

A sewer hose support handle provides for easy storage and manual transport of a standard foldable sewer hose support as are popular among recreational vehicle owners. The flexible handle is formed from plastic and includes a biased longitudinal member having parallel ends. Each of the handle ends includes a flange which can be positioned below the terminal sections of the sewer hose support. A grip affixed to the longitudinal member allows the combination sewer hose support and handle to be easily lifted and carried.

19 Claims, 4 Drawing Sheets

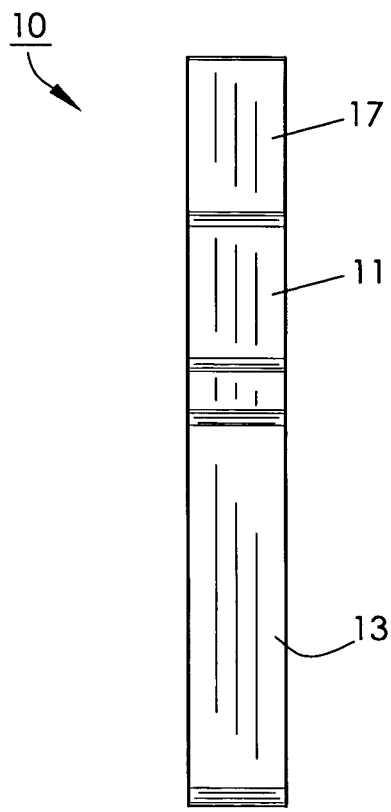
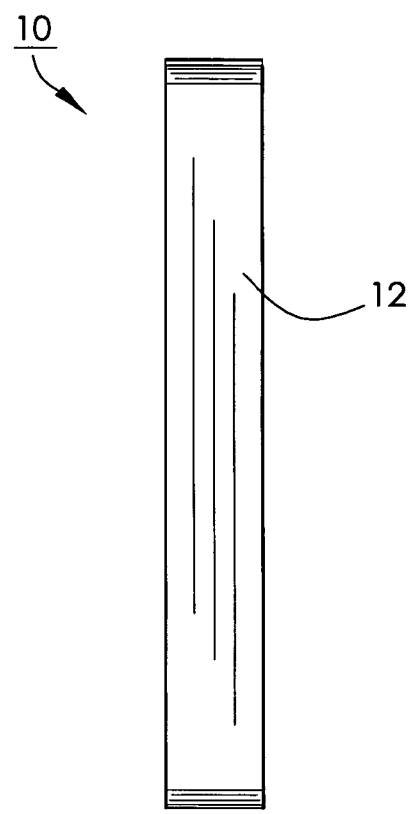
FIG. 5          FIG. 6
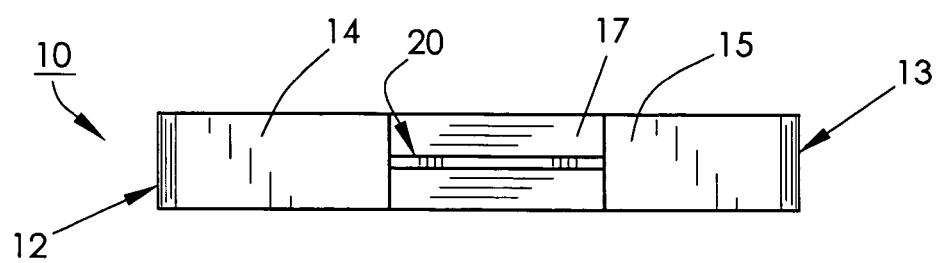
FIG. 7
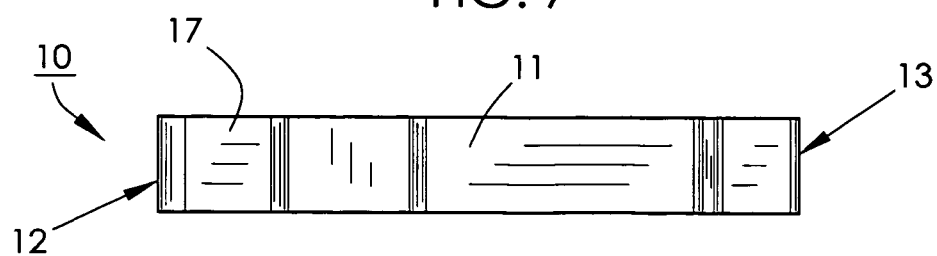
FIG. 8

COMBINATION HANDLE AND SEWER HOSE SUPPORT

FIELD OF THE INVENTION

The invention herein pertains to sewer hose supports as used with recreational vehicle (RV) sewage hoses and particularly pertains to a handle having a pair of flexible ends for releasable attachment to a sewer hose support for storage purposes.

DESCRIPTION OF THE PRIOR ART AND OBJECTIVES OF THE INVENTION

Flexible sewer hoses have been used by recreational vehicle owners for many years at RV parks, rallies and the like. Upon arrival, RV owners connect a standard sewer hose to the RV sewage outlet valve and the terminal end of the sewer hose is then usually joined to a septic tank or sewage treatment inlet pipe. To insure adequate gravitational flow through the sewer hose, hose supports are often used which are usually plastic products having a plurality of sections hinged together to allow folding and unfolding in a somewhat accordion style manner such as the RV sewer hose support shown in U.S. Pat. No. 6,619,596. Sewer hose supports work well but handling and storage of the collapsible hose supports pose problems since the hose supports are often rinsed and wet while handling. Even when dry, handling problems remain as the sections tend to inadvertently unfold during carrying and storage, increasing the risks of damage. Thus, to assist the RV owners in the hose support handling problems, the present invention was conceived and one of its objectives is to provide a flexible handle which can be easily, securely affixed to a folded multi-section sewer hose support to maintain its collapsed posture for manual handling.

It is another objective of the present invention to provide a flexible handle for a sewer hose support which includes a pair of parallel ends with flanges affixed thereto for engaging the bottom of the sewer hose support.

It is still another objective of the present invention to provide a flexible handle which can be securely affixed to the sewer hose support yet which is inexpensive to manufacture and purchase.

It is yet another objective of the present invention to provide a handle for a sewer hose support which in combination with the sewer hose support helps prevent damage to the hose support during transport and storage.

Various other objectives and advantages of the present invention will become apparent to those skilled in the art as a more detailed description is set forth below.

SUMMARY OF THE INVENTION

The aforesaid and other objectives are realized by providing a lightweight polymeric handle for use in combination with a standard folding multi-sectional RV sewer hose support. The handle includes a top, ribbed longitudinal member to which an inverted C-shaped grip is affixed. At each end of the longitudinal member a depending, flexible handle end is provided in which the handle ends are substantially parallel. Flanges are affixed to the bottoms of each of the handle ends in opposing relation whereby, upon manually flexing and urging the handle ends outwardly, they can be slid over the sewer hose support, the flanges lined up with the bottom of the sewer hose support and upon releasing the handle ends the flanges return to their normal parallel alignment underneath the bottom of the sewer hose support to maintain the sewer hose support in a collapsed state. The handle can then be grasped and the combination sewer hose support and handle can be easily lifted, transported and placed in a storage compartment of the RV for transportation or other purposes. Subsequently, upon arrival at an RV park or otherwise, the combination handle and sewer hose support can be easily removed from storage and the handle removed from the sewer hose support by pivoting or flexing the ends outwardly to release the sewer hose support for use.

BRIEF DESCRIPTION OF THE DRAWINGS

FIG. 5 depicts a front elevational view of the handle as seen in FIG. 4;

FIG. 6 pictures a rear elevational view of the handle as seen in FIG. 4;

FIG. 7 shows a bottom plan view of the handle as shown in FIG. 4; and

FIG. 8 illustrates a top plan view of the handle as shown in FIG. 4.

DETAILED DESCRIPTION OF THE PREFERRED EMBODIMENT AND OPERATION OF THE INVENTION

Figure 1:
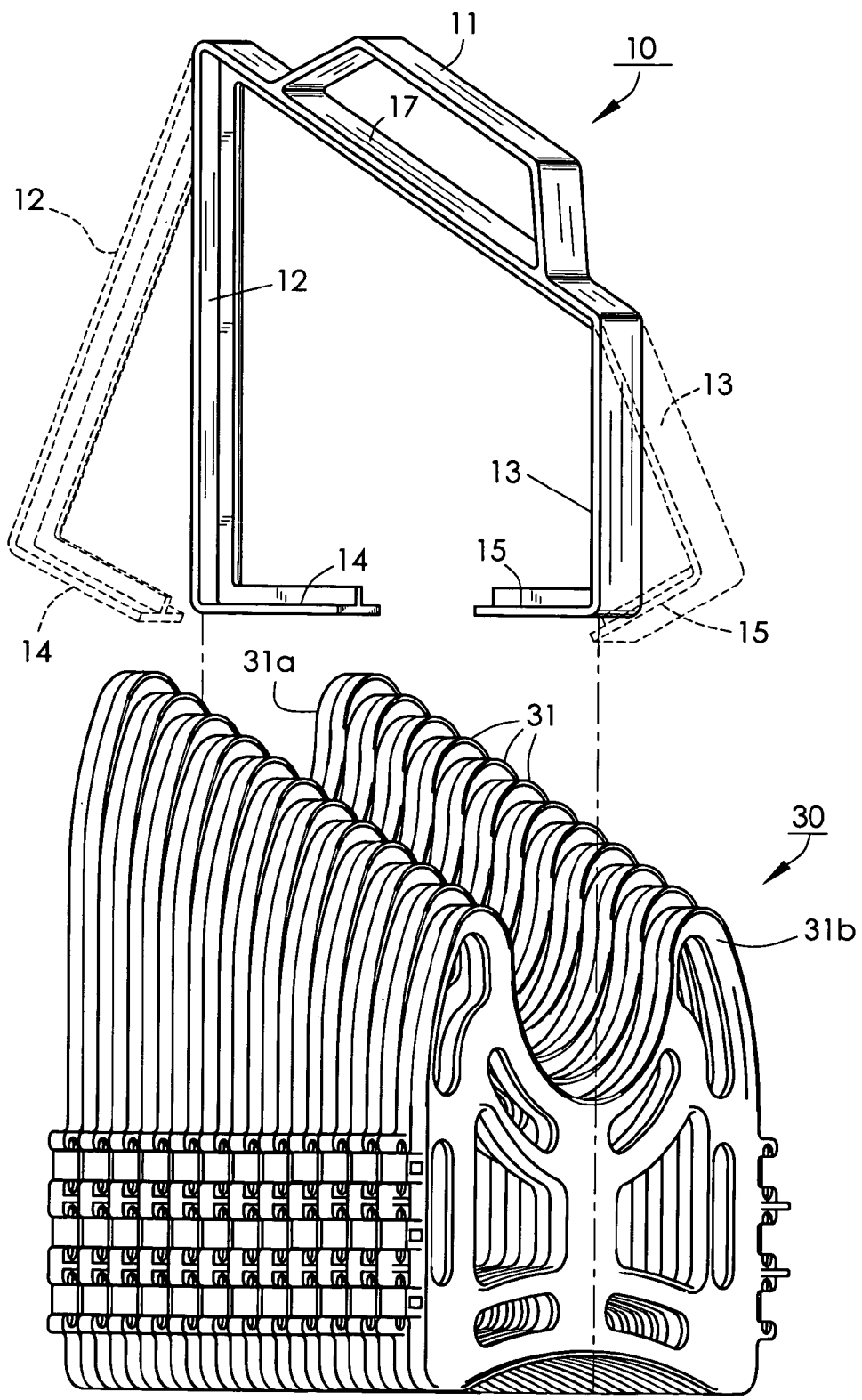
FIG. 1 shows a front, top left side perspective view of a typical sewer hose support with the handle of the invention exploded therefrom and shown with the ends flexed as for attachment purposes in dotted line fashion.

For a better understanding of the invention and its operation, turning now to the drawings, FIG. 1 demonstrates conventional RV sewer hose support 30 similar to that shown in U.S. Pat. No. 6,619,596, which is folded for compact storage and transport. Hose support 30 consists of a plurality of sections 31 each of which have a different height beginning with shortest terminal section 31b and extending to tallest terminal section 31a. Each section 31 is hinged along one side to the corresponding section 31 in order to unfold and extend for support of a standard RV sewer hose (not shown). After use the sewer hose is generally removed, rinsed and stored and sewer hose support 30 is folded into its compact configuration as shown in FIG. 1 and is likewise rinsed, collapsed and stored for future use. The manual handling and carrying of hose support 30 is often difficult as it may be wet. Further, the transport and storage of hose support 30 is often inconvenient as it tends to unfold or extend during handling and storage. In order to remedy the handling and storage problems, preferred handle 10 as shown in FIG. 1, is preferably molded from a flexible, conventional polymeric material such as polypropylene to accommodate attachment and release from hose support 30. Handle 10 includes biased longitudinal member 17 having handle ends 12, 13 with respectively, flanges 14, 15.

Figure 2:
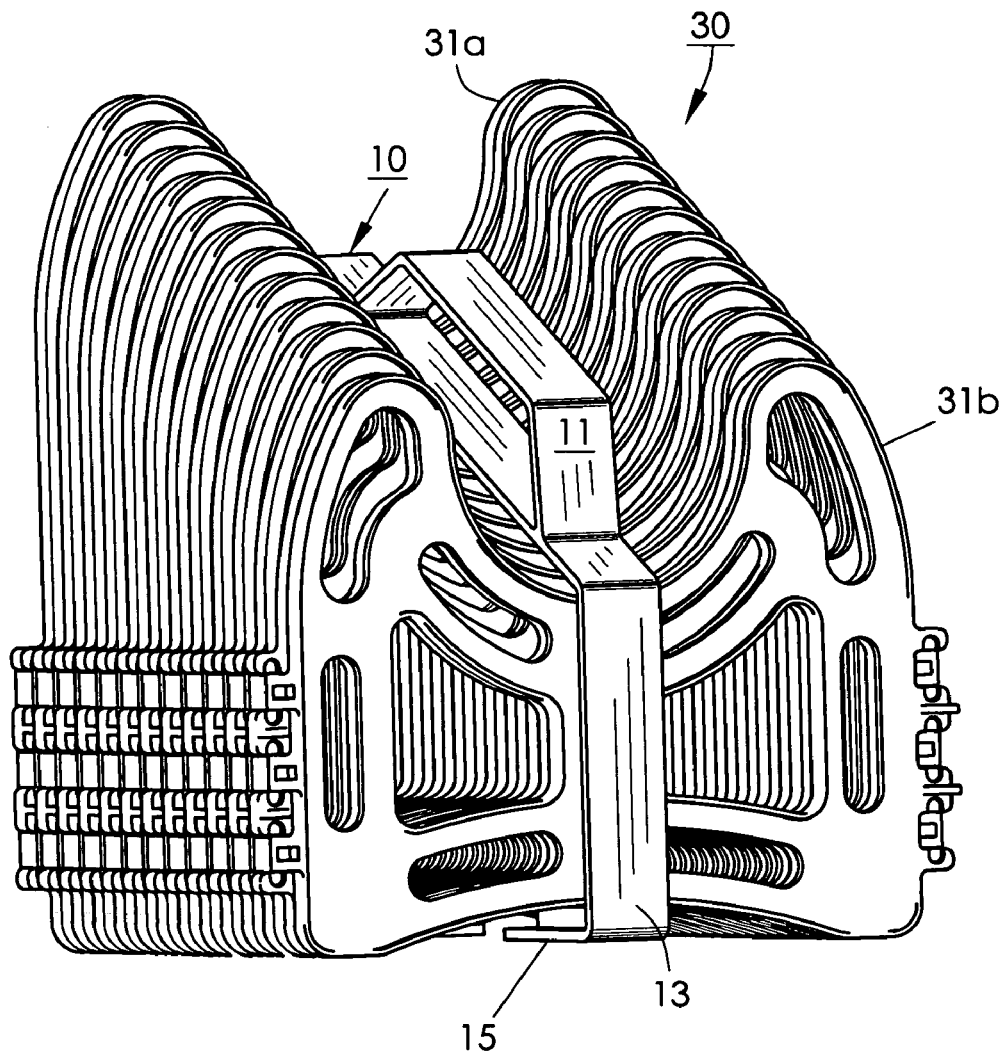
FIG. 2 illustrates a front, top, left side perspective view of the sewer hose support with the handle affixed.

Handle 10 is placed on hose support 30 by grasping and pivoting (flexing) normally parallel handle ends 12, 13 outwardly as depicted in dotted lines in FIG. 1. With handle ends 12 and 13 so flexed, handle 10 can be slid over hose support 30. Upon release of handle ends 12, 13, each respectively returns to its normal parallel posture whereby flanges 14, 15 are positioned below terminal sections 31a (FIG. 3) and 31b (FIG. 2) of hose support 30 and compactness of hose support 30 is assured with handle 10 thereon as seen in FIGS. 2 and 3.

Figure 3:
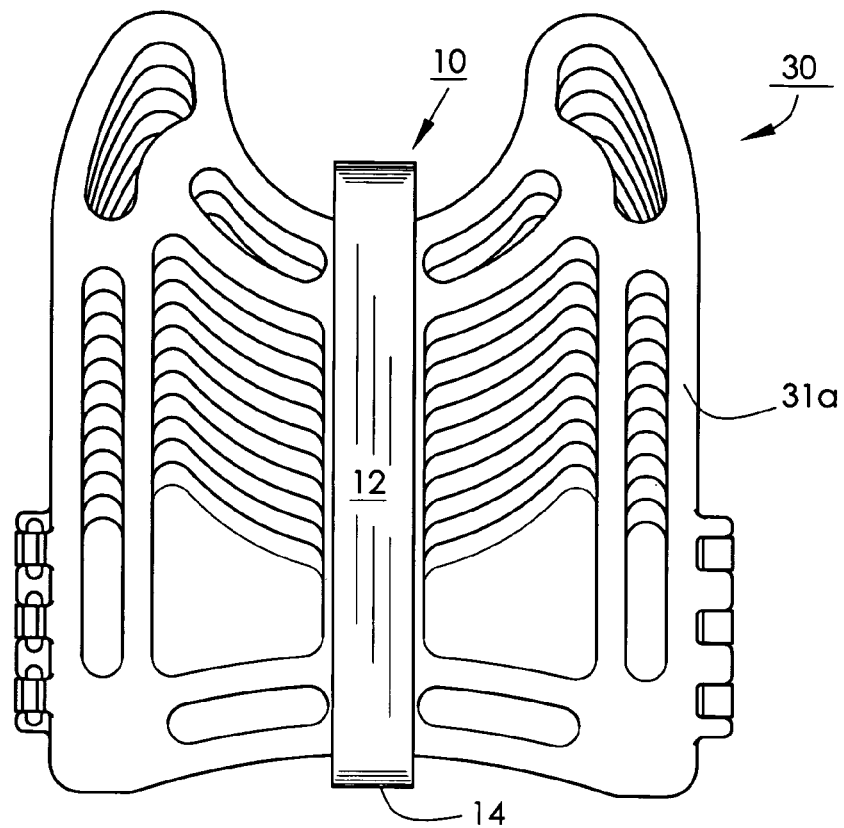
FIG. 3 demonstrates a rear elevational view of the sewer hose support with the handle attached as in FIG. 2.

In FIG. 3 an elevational view of hose support 30 in combination with handle 10 is shown with flange 14 in place below hose support terminal section 31a.

Figure 4:
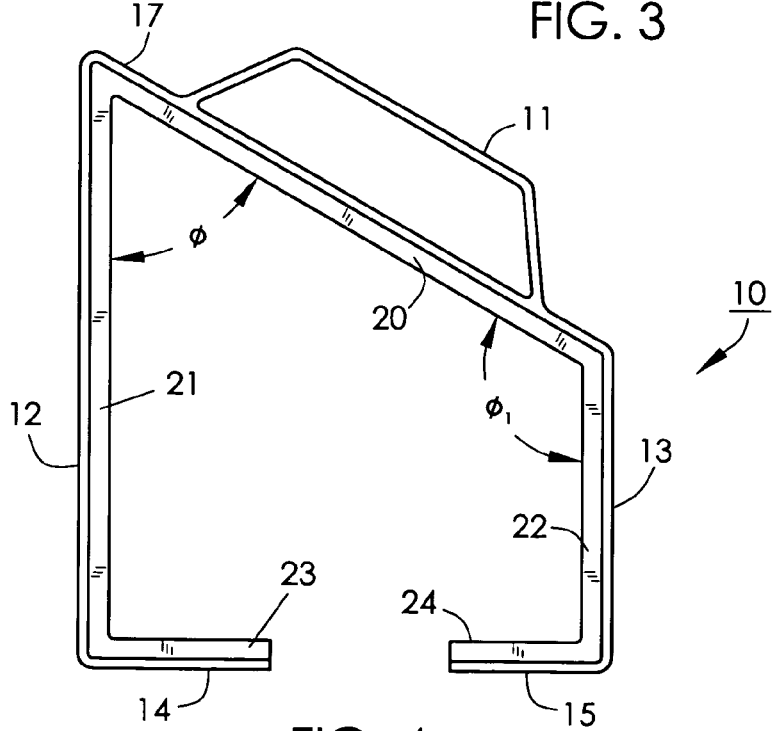
FIG. 4 features a left side elevational view of the handle as apart from the sewer hose support.

In FIG. 4, preferred handle 10 is shown in a side elevational view apart from hose support 30. Handle 10 further includes an inverted C-shaped grip 11 affixed to longitudinal member 17. In addition, longitudinal member 17 is substantially biased relative to unflexed flanges 14, 15. Angle ø as shown in FIG. 4 is approximately sixty-five degrees (65°) whereas angle $ø_1$ is approximately one hundred and five degrees (105°). The length of longitudinal member 17 can be manufactured to accommodate various sewer hose supports which are fabricated with different numbers of sections for different sewer hose lengths such as ten feet (10') (3.05 meters), sixteen feet (16') (4.87 meters) or other lengths. Hose support 30 is formed to accommodate a ten foot (10') sewer hose with longitudinal member 17 approximately ten inches (10") (25.4 cm) in length.

Handle 10 is further shown in FIGS. 4 and 7 having strengthening rib 20 along the inside of longitudinal member 17. Strengthening rib 20 is centrally positioned and is contiguous with strengthening rib 21 on long handle end 12 and rib 22 on short handle end 13. Strengthening ribs 23, 24 on respectively flanges 14, 15 are also shown in FIG. 4. Strengthening ribs 20, 21, 22, 23 and 24 are integrally formed during molding from a typical, suitable polymeric material. In FIG. 7 the width of strengthening rib 20 is seen and as would be understood ribs 21, 22, 23 and 24 are identical in width with the lengths varying accordingly as seen in FIG. 4. The height of strengthening ribs 20, 21, 22, 23 and 24 is seen in FIG. 4.

Once handle 10 has been positioned on hose support 30, ends 12 and 13 return to their normal vertical parallel position as shown in FIGS. 2, 3 and 4 to securely hold handle 10 in place around hose support 30 for convenience in carrying and storage. When hose support 30 is needed, handle ends 12, 13 can be easily, manually flexed outwardly as seen in dotted line fashion in FIG. 1 whereby flanges 14, 15 disengage hose support 30 and handle 10 can then be removed. With handle 10 in place on hose support 30 it can be manually handled easily and safely.

The illustrations and examples provided herein are for explanatory purposes and are not intended to limit the scope of the appended claims.

We claim:

1. A handle and hose support in combination said handle comprising:
    (a) a longitudinal member;
    (b) a long flexible end, said long flexible end joined to said longitudinal member; and
    (c) a short end, said short end attached to said longitudinal member;
  said hose support comprising:
    (a) a plurality of sections, each of said plurality of sections having a different height,
  whereby said handle is releasably attached to said plurality of sections.

2. The combination of claim 1 wherein said handle further comprises a rib, said rib affixed to said longitudinal member.

3. The combination of claim 1 wherein said long end is opposingly positioned on said longitudinal member to said short end.

4. The combination of claim 1 wherein said handle is formed from a polymeric material.

5. The combination of claim 1 wherein said handle comprises a grip, said grip affixed to said longitudinal member.

6. The combination of claim 1 wherein said short end and said long end are affixed in parallel relation to said longitudinal member.

7. A handle and hose support in combination, said handle comprising:
    a) a flexible longitudinal member;
    b) a grip, said grip attached to said longitudinal member;
    c) said longitudinal member comprising a pair of opposing ends, said pair of opposing ends comprises a long end and a short end, said ends for engaging said hose support;
  said hose support comprising:
    (a) a plurality of sections, each of said plurality of sections having a different height,
  whereby said handle is releasably attached to said plurality of hose support sections.

8. The combination of claim 7 wherein said handle ends are flexible.

9. The combination of claim 7 wherein said handle is formed from a polymeric material.

10. The combination of claim 7 wherein said hose support comprises a short terminal section.

11. The combination of claim 10 wherein said hose support comprises a tall terminal section.

12. The combination of claim 7 wherein each of said sections is hinged to another section.

13. The combination of claim 12 wherein each of said sections is hinged along a side.

14. The combination of claim 7 wherein said hose support is foldable to a compact configuration.

15. The combination of claim 7 wherein said grip is rigid.

16. The combination of claim 7 wherein said grip is formed from a polymeric material.

17. The combination of claim 7 wherein said long and short ends are affixable in mutually parallel relation.

18. The combination of claim 7 wherein said handle can be slid over said hose support.

19. The combination of claim 7 wherein said grip is formed having an inverted C-shape.

* * * * *